United States Patent [19]

Nelle

[11] Patent Number: 6,092,296
[45] Date of Patent: Jul. 25, 2000

[54] SCALE AND SCANNING UNIT OF A LENGTH MEASURING INSTRUMENT, AND METHOD FOR ATTACHING A SCALE

[75] Inventor: Günther Nelle, Bergen, Germany

[73] Assignee: Dr. Johannes Heidenhain GmbH, Traunreut, Germany

[21] Appl. No.: 08/949,008

[22] Filed: Oct. 10, 1997

[30] Foreign Application Priority Data

Oct. 11, 1996 [DE] Germany .......................... 196 41 966
Oct. 11, 1996 [DE] Germany .......................... 196 41 965
Jul. 10, 1997 [DE] Germany .......................... 197 29 481

[51] Int. Cl.⁷ ................................................. G01B 11/04
[52] U.S. Cl. ................................. 33/706; 33/700; 33/712
[58] Field of Search ............................. 33/706, 430, 436, 33/483, 700, 702, 703, 704, 707, 708, 712, 758

[56] References Cited

U.S. PATENT DOCUMENTS

| | | |
|---|---|---|
| 4,060,903 | 12/1977 | Ernst . |
| 4,070,759 | 1/1978 | Nelle . |
| 4,120,093 | 10/1978 | Spies . |
| 4,136,958 | 1/1979 | Nelle . |
| 4,149,319 | 4/1979 | Nelle . |
| 4,160,328 | 7/1979 | Ernst . |
| 4,169,316 | 10/1979 | Ernst . |
| 4,170,826 | 10/1979 | Holstein . |
| 4,170,829 | 10/1979 | Nelle . |
| 4,189,840 | 2/1980 | Holstein . |
| 4,198,757 | 4/1980 | Nelle . |
| 4,273,447 | 6/1981 | Nelle . |
| 4,276,696 | 7/1981 | Ernst . |
| 4,320,578 | 3/1982 | Ernst . |
| 4,400,880 | 8/1983 | Nelle . |
| 4,413,416 | 11/1983 | Ernst . |
| 4,459,751 | 7/1984 | Nelle . |
| 4,479,304 | 10/1984 | Nelle . |
| 4,492,032 | 1/1985 | Nelle . |
| 4,509,262 | 4/1985 | Nelle . |
| 4,517,742 | 5/1985 | Ernst . |
| 4,530,157 | 7/1985 | Nelle . |
| 4,534,113 | 8/1985 | Holstein . |
| 4,549,354 | 10/1985 | Affa et al. . |
| 4,554,741 | 11/1985 | Affa . |
| 4,559,707 | 12/1985 | Oberhans . |
| 4,570,346 | 2/1986 | Burkhardt . |
| 4,593,471 | 6/1986 | Nelle . |
| 4,593,472 | 6/1986 | Berner . |
| 4,649,648 | 3/1987 | Nagaoka et al. . |
| 4,776,098 | 10/1988 | Nelle . |
| 5,551,163 | 9/1996 | Affa . |
| 5,611,148 | 3/1997 | Affa ........................................... 33/702 |
| 5,655,311 | 8/1997 | Affa ........................................... 33/706 |
| 5,842,283 | 12/1998 | Yatsu et al. ................................ 33/708 |

FOREIGN PATENT DOCUMENTS

| | | |
|---|---|---|
| 0 110 059 | 6/1984 | European Pat. Off. . |
| 25 05 585 | 8/1976 | Germany . |
| 30 20 003 | 12/1981 | Germany . |
| 35 30 776 | 3/1986 | Germany . |
| 36 25 795 | 3/1988 | Germany . |
| 44 06 799 | 9/1995 | Germany . |

*Primary Examiner*—Christopher W. Fulton
*Attorney, Agent, or Firm*—Brinks Hofer Gilson & Lione

[57] ABSTRACT

A scale or scanning unit of a measuring instrument for measuring the relative motion of two objects movable toward one another is secured to the one object and cooperates with a scanning unit or a scale to detect the relative location of the object. According to the invention, the scale or the scanning unit has means for at least one interlocking connection with the object, which is embodied along the longitudinal extent of the scale or the scanning unit.

61 Claims, 3 Drawing Sheets

SCALE AND SCANNING UNIT OF A LENGTH MEASURING INSTRUMENT, AND METHOD FOR ATTACHING A SCALE

Applicant claims, under 35 U.S.C. § 119, the benefit of priority of the filing date of Jul. 10, 1997 of a German patent application, copy attached, Ser. No. 197 29 481.2, filed on the aforementioned date, the entire contents of which are incorporated herein by reference. Applicant claims, under 35 U.S.C. § 119, the benefit of priority of the filing date of Oct. 11, 1996 of a German patent application, copy attached, Ser. No. 196 41 965.4, filed on the aforementioned date, the entire contents of which are incorporated herein by reference. Applicant further claims, under 35 U.S.C. § 119, the benefit of priority of the filing date of Oct. 11, 1996 of a German patent application, copy attached, Ser. No. 196 41 966.2, filed on the aforementioned date, the entire contents of which are incorporated herein by reference.

FIELD OF THE INVENTION

The invention relates to a scale and a scanner unit of a measuring instrument for measuring the relative motion of objects, and to a method for attaching a scale.

BACKGROUND OF THE INVENTION

Publication Nos. DE 25 05 585 C3; DE 36 25 795 C2; and DE 35 30 776 C2, describe a scale that is used to detect the relative location of a movable part of a machine tool. In this example, the scale is secured as part of a measuring instrument to the machine bed of the machine. To detect the relative location of the machine bed and a workpiece clamped onto it with respect to a tool disposed on a movable part of the machine, a scanning unit is attached to the movable part of the machine, for example. Thus, the scanning unit is secured to the movable part of the machine and scans the scale which is attached to the fixed machine bed. For securing the scale to an object it is known from German Patent Publication No. DE 25 05 585 C3 (corresponding to U.S. Pat. No. 4,070,759) to introduce the scale into a hollow body that is secured to the object by a jointlike fastening elements provided on its ends. This arrangement avoids constraining forces in attaching the hollow body in which the scale is received.

Along with the incidence of constraining forces in attaching a scale, or the housing of a scale, the change in length of the components as a result of temperature fluctuations causes particular problems. German Patent Publication No. DE 36 25 795 C2 (corresponding to U.S. Pat. No. 4,776,098) disclosed that it was possible to adjust the location of a measurement reference point on the scale independently of particular conditions of the processing machine to which the scale is attached, and in particular with regard to the temperature behavior. To that end, various length compensating elements are provided.

Ideally, however, the scale should be secured to an object in such a way that its expansion behavior in response to temperature fluctuations is adapted to the expansion behavior of the object to which it is attached. In order to assure that a scale attached to an object will "breathe" along with the object, or, in other words, will adapt itself in terms of its longitudinal expansion and shrinkage to the behavior of the object, scales of measuring instruments known in the art are secured by correspondingly strong screws. That is, in such a connection, the scale is pressed against the object with such force that it follows the lengthwise changes of the object because of the forces of friction transmitted to a contact-pressure face.

However, such a connection makes high demands of the fastening screws to be used and moreover cannot guarantee that the longitudinal expansion of the scale will be uniform over its entire length. Moreover, particularly with long scales, vibration can occur that causes measurement errors in detecting the relative location of the object to which the scale is secured. These problems exist equally with regard to the attachment of the scanning unit that cooperates with the scale.

In the arrangement described in German Patent Publication No. DE 35 30 776 C2 (corresponding to U.S. Pat. No. 4,649,648), an interlocking/form fitting connection of the scale to an object is provided. This interlocking connection is affected by rounded surfaces of elements provided on the scale and mounting blocks that are to be attached to the object. The mounting blocks have suitably shaped surfaces with which the rounded surfaces of the corresponding elements on the scale engage, in order to embody a interlocking fastening of the scale to the object. For this type of interlocking fastening of a scale, it must be assured in an expensive and complicated way that the mounting blocks are securely fastened in a defined location to the object. In particular, fastening these components of the interlocking connection to be embodied with the corresponding elements on the scale cannot be done solely by means of screws; a pin system must be provided in addition. Thus, the arrangement is comparatively expensive and complicated.

SUMMARY OF THE INVENTION

In view of the described disadvantages of the scales and scanning units known from the prior art, it is an object of the invention to create a scale and scanning unit, and a method for attaching a scale, which can be secured simply to an object in such a way that a reliable, precise scanning of the scale by a scanning unit for detecting the relative location of an object is possible.

Accordingly, the scale or the scanning unit has at least one interlocking connection with an object which is embodied along the longitudinal extent of the scale or the scanning unit. Because of the interlocking connection of the scale or the scanning unit to an object, fastening elements typically required for frictional engagement, such as heavy-duty screws, can be dispensed with. An interlocking connection advantageously provides for a favorable transmission of forces which occur upon temperature fluctuations as a consequence of changes in length of the object to the scale or the scanning unit attached to the object.

Since the interlocking connection according to the invention is embodied along the lengthwise extent of the scale or the scanning unit, an attachment to an object is made possible that assures especially good bracing of the scale or the scanning unit. For long scales, such a fastening can be used to prevent vibration of the scale in directions at right angles to the longitudinal extent of the scale. Because such vibration is prevented, an improvement in accuracy in the detection and scanning of the scale is achieved. Moreover, by suitably embodying the interlocking connection in the course of the longitudinal extent of the scale or the scanning unit, it can be attained that the scale or the scanning unit especially uniformly follows along with an expansion or shrinkage of the object to which it is attached.

European Patent Publication No. EP 0 110 059 B1 (corresponding to U.S. Pat. No. 4,530,157) discloses a fastening element, approximately in the middle of a scale carrier. The securing element disclosed in this reference, however, employs frictional engagement by a fastening screw in order to transmit the incident forces to the secured scale, so that an avoidance of the especially heavy-duty screws required in the prior art is attained for the first time by securing the scale as an interlocking connection according to the invention. Moreover, in the arrangement shown in the aforementioned reference, securing elements are provided in the region where the scale is fastened on its ends; these elements allow a lengthwise compensation in the direction of the longitudinal extent of the scale. Hence, by means of this type of fastening with a frictional connection in the course of the lengthwise extent of the scale, it is not possible to achieve an attachment of the scale in such a way that the scale follows along with the changes in length of an object.

In accordance with a preferred embodiment, for the device at least one interlocking connection is provided, which acts in a direction that extends parallel to the longitudinal extent of the scale or the scanning unit. In this embodiment, in the way already indicated, it is possible to assure that the device will especially uniformly follow the changes in length of an object. Because at least one interlocking connection acts in the course of its longitudinal extent in the direction of the longitudinal extent of the device, a force is transmitted, at this attachment point of device via the interlocking connection, that keeps the device at this point in a location that is fixed relative to the object to which the device is secured.

Thus, by embodying interlocking connections in the course of the longitudinal extent of the device, in particular the scale, that act in the direction of the longitudinal extent of the device or scale, an invariable position with regard to an object is attained for individual points, so that for the entire course of the scale it can be assured that the scale will adapt uniformly to any changes in length of the object. Because of the thus-achieved especially favorable "breathing" of the scale with the object whose relative location is to be detected, an especially precise detection of this location is achieved, since the location of the points to be scanned on the scale matches especially exactly with the respective points on the object.

In accordance with a further embodiment, interlocking connections may be provided, which act in a direction that extends perpendicular to the longitudinal extent of the scale or the scanning unit. As a result, it is advantageously attained that vibrations of the device in directions perpendicular to the longitudinal extent of the device are provided. Such vibrations can occur especially in comparatively long scales, and they make for incorrect measurement of the relative location of the scale and hence naturally of the relative location of the object to which the scale is secured. By means of the interlocking connection according to the invention, with an operative direction perpendicular to the longitudinal extent of the scale, a fastening for the scale of the invention can thus be attained that enables an especially accurate measurement.

In a preferred embodiment of the device of the invention, the interlocking connection comprises an element with an at least regionally spherically curved surface, which is preferably attached to the scale or the scanning unit, and which represents the means according to the invention for the interlocking connection. The counterpart for the interlocking connection comprises a conical seat, a spherically curved seat or a largely V-shaped groove, which is preferably to be embodied on the object to which the device is secured. With such an embodiment of the scale or the scanning unit according to the invention, especially good results have been obtained in terms of the transmission of the incident forces via the interlocking connection. This may involve balls having a diameter of a few centimeters that are attached to the scale or the scanning unit by means of screws. It is also conceivable to use smaller balls, with a diameter of a few millimeters.

Particularly for smaller balls, it is advantageous if they are let into respective conical recesses on the scale or the scanning unit. These forces can be embodied at little effort or expense on the scale or the scanning unit, and the small balls can be fixed in them, for instance with a suitable adhesive. They are let into the conical recesses in such a way that they protrude from the surface, so that when the scale or the scanning unit is screwed on, they dig into the surface of the object and thus assure the interlocking connection according to the invention.

Preferably, the interlocking connection also has at least one pin. A pin, which is preferably embodied as a threaded pin, can be used and mounted on the scale or the scanning unit in a simple way by forming a interlocking connection with the object. For instance, a threaded pin with a conical recess on its front end can be used, so that balls, which have been placed in a bore in the scale or the scanning unit, contacting the surface of the object, will be pressed into the surface of the object in such a way as to produce a interlocking connection.

For a pin as a component of the interlocking connection, there are also advantages if the pin has a conical tip or a cup point. In both cases, without using balls, the pin is screwed into a bore in the scale or the scanning unit in such a way that its suitably shaped front end digs into the surface of the object. Especially good results have been gained here with a cup point, which is embodied as a kind of pointed rib encompassing the end face of the pin in its outer region.

In accordance with a further preferred embodiment, at least one interlocking connection on the one hand comprises an element with an at least regionally spherically curved surface, which preferably is attached to the scale, and represents the means for forming an interlocking connection in the course of the longitudinal extent of the scale. The counterpart of the interlocking connection, which counterpart is preferably to be embodied on the object, comprises a cylindrically curved or a largely V-shaped groove. Into the thus-formed recesses, when the scale or the scanning unit is attached, the corresponding elements with the regionally cylindrically curved surface are received, and with the secured scale or the scanning unit assure the transmission of the forces that cause changes in length for the scale or the scanning unit and that for especially precise measurement results assure that the scale or the scanning unit will "breathe" with the object.

It is also proved to be advantageous if in accordance with a preferred embodiment, for the device in the region of its ends, at least one interlocking connection with the object is provided. Accordingly, the device also has corresponding means in the region of its ends for embodying an interlocking connection. Although securing the device with the interlocking connection of the invention in the region of its longitudinal extent on the end of the device can be accomplished in any arbitrary way, it is preferred that these connections be embodied as interlocking connections, in order to gain the aforementioned advantages in securing the device.

Preferably, the means on the device by way of which an interlocking connection is embodied, and in particular the elements having the regionally spherically and/or cylindrically curved surfaces, are mounted adjustably on the device.

As a result of this embodiment of the device of the invention, particular advantages are obtained if a device mounted on an object is to be replaced. In that case, those forms by way of which the device is secured to the object by interlocking connections are typically already present on the object. However, it often happens that a newly manufactured scale that is intended to replace an existing scale will deviate from the scale to be replaced, because of the usual tolerances in terms of its dimensions and the dimensions of the means for an interlocking connection, in such a way that the new scale will "fit" the forms embodied on the object only inadequately. In that case, the preferred embodiment of the scale in which the corresponding means and elements are mounted adjustably, can assure the advantage that the location of the corresponding objects can be adapted in such a way that the scale can be attached fittingly to an object in order to replace an existing scale.

In another aspect of the invention, a measuring instrument for measuring the relative motion of two objects displaceable toward one another is presented that has a scale according to the invention or a scanning unit according to the invention. The scale is secured to a first object. The scanning unit is attached to a second object and cooperates with the scale to detect the relative location of the two objects. Such a measuring instrument to a certain extent represents the typical use for the scale or the scanning unit according to the invention.

For the measuring instrument, comprising the scale or the scanning unit, according to the invention, it is preferred that those forms by way of which the interlocking connection is effected in the region of the object are made directly in this object. This has the advantage that the expense for production and assembly of the measuring instrument according to the invention can be kept low, since any objects that have the suitable forms for an interlocking connection and are to be attached to an object can be avoided.

In a further aspect of the invention, a method for attaching a scale to an object is created, using elements of an interlocking connection that have through bores.

Accordingly, in the method of the invention the following steps are performed. The scale is disposed on the object, at the place intended for its being attached. Next, using the through bores of the elements on the scale, a respective bore is made in the object at the corresponding places. The use of the bores embodied in the elements of the scale can preferably be such that these bores are used for marking the corresponding places on the object, for instance by means of dotting marks. Alternatively, suitable drilling tools can be passed through the aforementioned bores in the elements of the scale in order to make the bores in the object.

According to the invention, in the region of these bores in the object, the forms for the interlocking connections for attaching the scale are then made directly in the object. Typically after this method step, the bores made in the object are provided with threads. However, the making of the thread can also be done before the forms used for the interlocking connections are made.

In conclusion, the scale is secured to the object by means of suitable connecting elements, in such a way that the aforementioned objects are in engagement with the forms made directly in the object and assure an interlocking fastening of the scale to the object. For the aforementioned connecting elements, fastening screws are preferred, which are screwed into the threaded bores made in the object.

In accordance with the forms and the object that are preferred for the arrangement according to the invention, it is preferred for the method of the invention that the forms made in the object are spherical curved seats or conical seats or cylindrically curved grooves or V-shaped grooves.

The invention is described below in terms of exemplary embodiments, taken in conjunction with the drawings.

DETAILED DESCRIPTION OF THE PRESENTLY PREFERRED EMBODIMENTS

Figure 1:
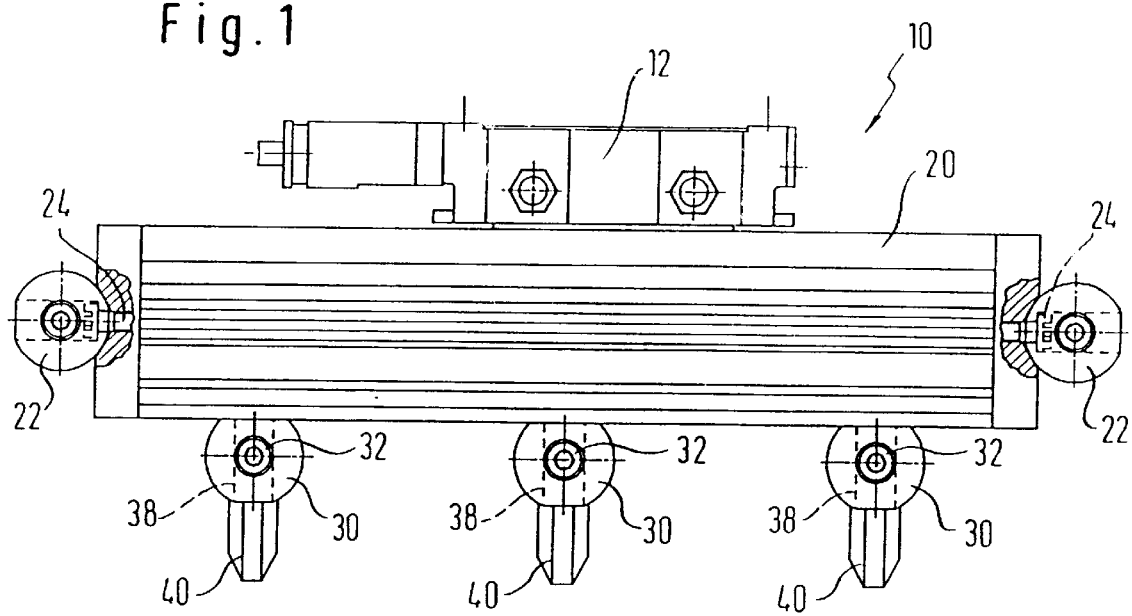
FIG. 1, a plan view of a measuring instrument with the scale of the invention.

As can be seen in FIG. 1, the embodiment of a measuring instrument 10 shown has on the one hand a first measuring device such as a scanning unit 12, which by way of example is attached to a movable object, such as a machine tool. On the other hand, the measuring instrument 10 has a second measuring device such as a scale 20, which is scanned by the scanning unit 12 in a suitable way in order to ascertain the relative location of a movable object to a fixed object, such as a machine bed on which the scale 20 is mounted. In the plan view of the measuring instrument 10 shown in FIG. 1, the housing of the scale 20 can be seen in particular; part of the scanning unit 12 protrudes into this housing in order to scan a graduated set of lines or the like in some suitable way.

The securing of the scale 20 to an object will now be described in detail, but the description can also be conceived of as equally applicable to the scanning unit 12 of the invention. For securing the scale 20 to an object, in which the scale 20 for particularly accurate detection of the relative location of an object follows along with any changes in length of this object, the scale has one ball 22 at each of its ends. The balls 22 are each secured to the scale 20 via screws 24 and represent means for a form fitting/interlocking connection of the scale 20 to an object. This fastening of the scale 20 at its ends will now be described in further detail.

In accordance with the invention, the scale 20 also has means that serve to make a form fitting/interlocking connection with an object along the longitudinal extent of the scale 20. These means are formed, in the embodiment shown in FIG. 1, by three balls 30 secured laterally to the scale 20. The balls 30 secured to the scale 20 represent one part of the form fitting/interlocking connections or connectors to an object according to the invention. The second part of these form fitting/interlocking connections or connectors is formed by grooves 40, which are embodied on the object to which the scale 20 is to be secured. In the plan view of FIG. 1, the three grooves 40, in the exemplary embodiment shown, can be seen by their outline.

Figure 2:
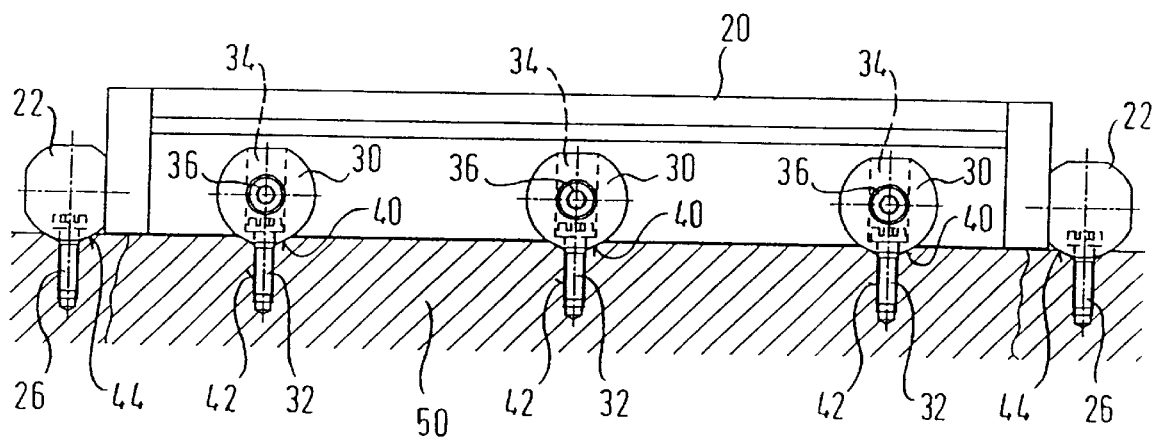
FIG. 2, a side view of the scale of the measuring instrument shown in FIG. 1.

As can be seen from the side view in fragmentary section in FIG. 2, the grooves 40 are each made in a V in the object 50 to which the scale 20 is secured. Each of the grooves 40 is adjoined by respective threaded bores 42 into which fastening screws 32 are secured, being introduced through respective bores 34 made in the vertical direction in the balls 30.

Screws 36 can also be seen in FIG. 2, through which the balls 30 are laterally secured to the scale 20. To that end, the screws 36 are passed through second bores 38, made in the horizontal direction in the balls 30; these bores can be seen best in the plan view of FIG. 1.

It should be noted with regard to the function of the screws 32, by which the scale 20 is secured to the object 50 via the balls 30, that these screws do not serve to transmit force between the object 50 and the scale 20. According to the invention, the transmission of any forces that arise because of changes in length of the object 50 and scale 20, caused by temperature fluctuations takes place by the interlocking connection in the form of the balls 30 and grooves 40. This means that because of the invention, it is possible to dispense with especially strong fastening screws that would be necessary in a frictional connection.

On the contrary, according to the invention the transmission of force takes place at the interlocking connections/connectors located in the course of the longitudinal extent of the scale 20. The result attained is first that the scale follows the changes in length of the object 50 directly at those places where the interlocking connections are located in the region of its longitudinal extent. In order that the relative location of the scale 20 will match the relative location of the object 50 over the entire length of the scale, in the embodiment shown the scale 20 is also connected at its ends to the object 50, via interlocking connections. To that end, balls 22 are provided on the scale 20 as described above.

Via vertically disposed screws 26, the balls 22 are screwed to the object 50. For the interlocking fastening of the scale 20 via the balls 22, the object 50 is provided at the appropriate places with further grooves 44 extending perpendicular to the plane of the drawing in FIG. 2. The balls 22 are fitted with their spherically curved surfaces into these grooves 44 in such a way that via the thus-formed interlocking connections, securing of the scale 20 to the object 50 is attained, with the scale 20 following the changes in length of the object 50 in the region of the entire length of the scale.

For the embodiment of the scale according to the invention shown in FIGS. 1 and 2, it should also be noted that the grooves 40, made on the object 50 for the purpose of the lateral interlocking connections likewise extend in a direction perpendicular to the longitudinal extent of the scale 20. The described "slaving effect" can be attained as a result, specifically in that via the interlocking connections formed laterally on the scale 20 and acting in the direction of the longitudinal extent of the scale, it is assured that the various places will directly follow the changes in length of the object 50.

Figure 3:
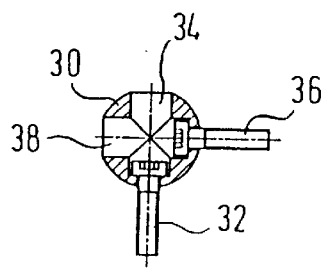
FIG. 3, a longitudinal section through an element, used in a scale shown in FIGS. 1 and 2, for making an interlocking connection.

In FIG. 3, to illustrate the structure of the balls 30 that represent the means for an interlocking connection between the scale 20 and the object 50, a longitudinal section through such a ball 30 is shown. Two bores 34, 38, offset by 90E, are each provided, passing through the center of the ball 30. The screw 36, by way of which the ball 30 is secured to the scale 20, is passed through the horizontally extending bore 38. In a similar way, the screw 32, by way of which the ball 30 is secured to the object 50 in the region of the respective groove 40, is passed through the vertically extending bore 34. For the respective connection, the bore 34, 38 has a region of reduced diameter on one end, through which region the shaft of the respective screw 32, 36 is passed. On the resultant shoulder, the head of the respective screw 32, 36 is supported.

Via the surface of the respective ball 30, which is spherically curved except for the openings of the bores 34, 38, the transmission of force with the respective groove 40 takes place, in the context of an interlocking fastening of the scale 20. In this respect it will be understood that the balls 22, mounted on the ends of the scale 20, may also be made with the structure shown in FIG. 3. However, for fastening the scale 20 by its ends a different type of fastening may also be provided. According to the invention, particularly in the region of the longitudinal extent of the scale 20, an interlocking connection with an object 30 is made, which in the instance shown is formed by the balls 30 and the respective grooves 40.

Figure 4:
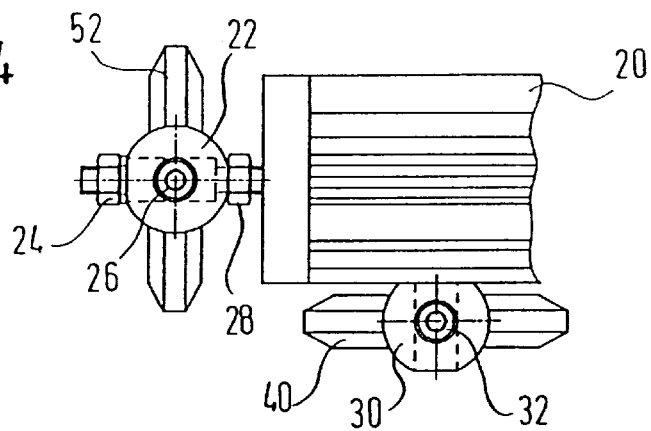
FIG. 4, a fragmentary plan view of a second embodiment of the scale of the invention.

In FIG. 4, a fragmentary plan view on a scale 20, secured to an object, is shown in a second embodiment. This embodiment is distinguished from the embodiment shown in FIGS. 1 and 2 both in terms of the design of the fastening of the scale 20 to the object on its ends and in terms of the lateral interlocking connection of the scale 20.

As can be seen in the plan view of FIG. 4, the mounting of the ball 22 on the scale 20, for one thing, is designed differently. In a preferred embodiment an adjustment is provided for this ball 20. This adjustment, to adapt the location of the ball 22 to the position of a groove 52 in the object, is achieved by means of a screw 24, which passes through the ball 22 for securing to the scale 20, and by a counternut 28. For exact adaptation of the location of the ball 22 to the position of the groove 52, an adjustment is done by suitably screwing in the screw 24 and subsequently fixing the ball 22 by means of the counternut 28.

This adjustability of the ball 22 is advantageous, particularly when the scale 20 of the invention is used as a replacement object, if a new scale 20, in which the grooves 52 have for instance already been made on the ends of the scale, is to be attached to an object. Because of unavoidable production variations, it cannot be assumed that a newly manufactured scale will fit exactly into the existing grooves 52. The location of the balls 22, by way of which the scale 20 is secured interlockingly to the object, can therefore be adapted by means of the described adjusting mechanism. The securing of the ball 22 in the groove 52 to make the interlocking connection is done in the same way as in the embodiment shown in FIGS. 1 and 2, via a screw 26.

The described adjusting mechanism for the ball 22, can naturally be used in the same way for the interlocking connections embodied in the course of the longitudinal extent of the scale. In FIG. 4, one such interlocking connection, in the course of the longitudinal extent of the scale 20, is shown in a second embodiment. In this embodiment, the interlocking connection acts in a direction perpendicular to the longitudinal extent of the scale. In this embodiment, the interlocking connection to the object differs from the embodiment shown in FIGS. 1 and 2 only in terms of the orientation of the groove 40 formed in the object.

As can be seen in the plan view of FIG. 4, the groove, into which a ball 30 is fitted for the sake of interlockingly securing the scale 20, extends parallel to the longitudinal extent of the scale 20, or in other words from left to right. In this embodiment, a force that acts at right angles to the longitudinal extent of the scale 20 can be transmitted via the interlocking connection between the ball 30 and the groove 40. This way of interlockingly securing the scale 20 can advantageously be employed for comparatively long scales, in order to prevent any vibrations at right angles to the longitudinal extent of the scale 20 that would impair the exact detection by a scanning unit of the relative location of the scale 20.

By securing the ball 30 in the groove 40 via a screw 32 in the manner described above, a fixation of the scale 20 in a direction at right angles to the plane of the drawing is moreover effected, so that particularly for long scales, good bracing of the scale over the course of its longitudinal extent can be attained. By means of the interlocking connection whose direction of action is in the plane of the drawing at right angles to the longitudinal extent of the scale 20, any vibrations in this direction can furthermore be avoided.

Figure 5:
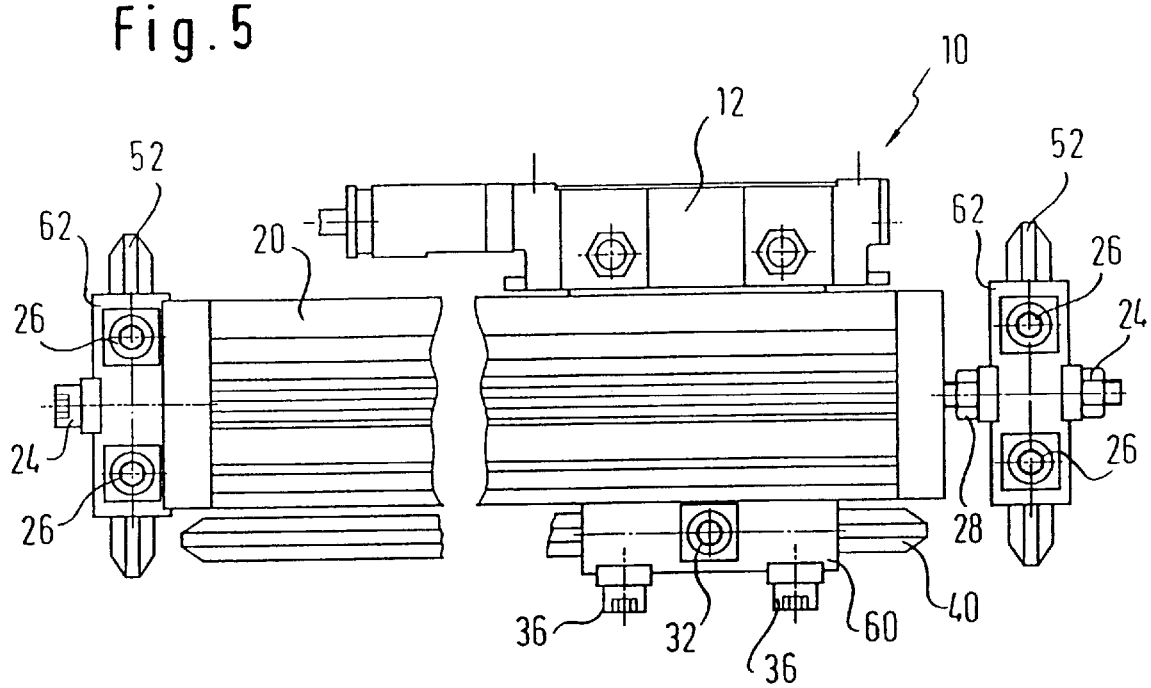
FIG. 5, a plan view of a measuring instrument having a third embodiment of the scale according to the invention.

In FIG. 5, a further embodiment of the scale of the invention is shown, in which the above-described advantageous actions can be attained by means of the special embodiment of the laterally embodied interlocking fastenings of the scale 20. In the plan view of FIG. 5, in the same way as in FIG. 1, a complete measuring system 10 can be seen, comprising a scanning unit 12 and the scale 20 according to the invention. From the plan view it can also be seen that in the embodiment shown in FIG. 5, the interlocking connections are designed in the form of cylinders 60, 62. For making the interlocking connection according to the invention in the course of the longitudinal extent of the scale 20, the cylinder 60, mounted on the scale 20 laterally via two screws 36, cooperates with a groove 40 extending parallel to the longitudinal extent of the scale.

Except that it is made longer in order to receive the cylinder 60, this groove 40 is equivalent to the groove 40 shown in FIG. 4 for receiving the ball 30. In the embodiment shown in FIG. 5, the securing of the cylinder 60 in the groove 40 is effected analogously via a screw 32. In this embodiment of the interlocking connection of the invention again, with a direction of action perpendicular to the longitudinal extent of the scale 20, the same advantages as have been described above for the embodiment shown in FIG. 4 can be attained. In particular, to avoid vibration in a direction at right angles to the longitudinal extent of the scale 20, the cylindrically curved surface of the cylinder 60 cooperates with the sides of the largely V-shaped groove 40.

Figure 6:
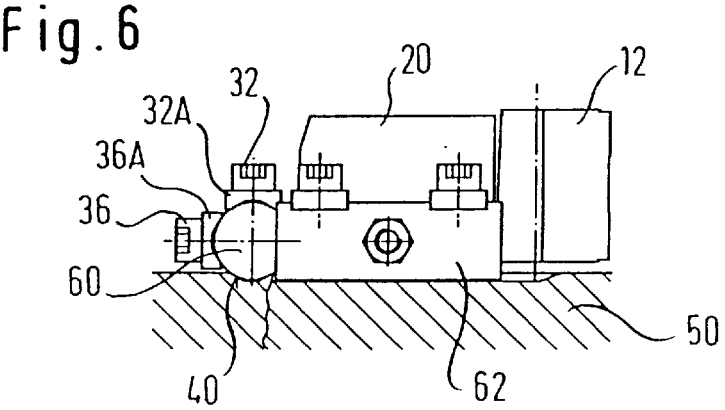
FIG. 6, a front view of the measuring instrument shown in FIG. 5.

In the embodiment shown in FIG. 5, the interlocking connections are also formed on the ends of the scale 20 via the cylinder 62 and grooves 52. In the same way that the ball 22 is attached to the scale 20 as shown in FIG. 4, the cylinder 62 shown on the right in FIG. 5 is attached adjustably to the scale 20 by means of a screw 24 and a counternut 28. The attachment of the cylinder 62 shown on the left to the scale 20 is effected via a simple screw 24. To secure the two cylinders 62 in the grooves 52, screws 26 are used, in an analogous way to the balls 22 used for the embodiments described previously herein. From the front view of FIG. 6, the selected form, in the embodiment of the scale 20 shown in FIG. 5, of the interlocking connection to the object 50 can be seen more clearly. In this view (seen from the right in terms of FIG. 5) it becomes clear how the cylinder 60, attached to the scale 20 laterally via screws 36, cooperates with the sides of the groove 40 for the sake of interlockingly securing the scale 20. In particular it can be seen that if force is exerted on the scale 20 in a direction from right to left in terms of FIG. 6, the result is bracing of the scale 20 via the cylindrically curved surface of the cylinder 60 and the respective side of the groove 40, in such a way that vibrations of the scale 20 in the lateral direction, parallel to the plane of the drawing in FIG. 6, are prevented. By securing the cylinder 60 via the screw 32 in a direction at right angles to the surface of the object 50, motions of the scale 20 in this direction can also be prevented, motions that would lead to incorrect detection of the relative location of the scale 20 by the scanning unit 12.

It can also be seen from FIG. 6 that the securing of the cylinder 60 by the screws 32, 36 is effected via respective adapters 32A, 36A. These adapters 32A, 36A are each provided with grooves similar to the groove 40, in order to achieve an especially advantageous transmission of the securing forces from the screws 32, 36 to the cylinder 60. The cylinder 62 on the end of the scale 20 is secured in a similar way, both to the scale 20 itself and to the object 50.

According to the invention, an interlocking connection of the scale 20 to the object 50 in the course of its longitudinal extent is in the form of the interlocking connection between the cylinder 60, mounted laterally on the scale 20, and the groove 40 made in the object 50; as a result, advantageous bracing and securing in a direction at right angles to the longitudinal extent of the scale is attained.

Figure 7:
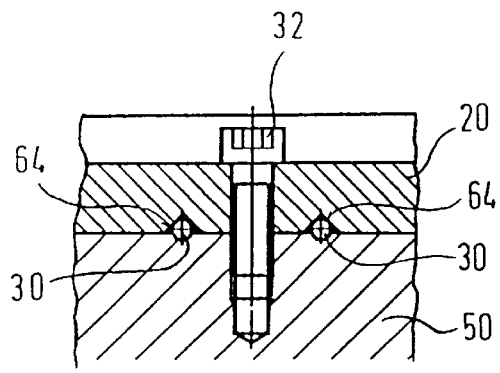
FIG. 7, in a sectional view, a portion of a device according to the invention with the interlocking connection in a further embodiment.

In FIG. 7, a portion of the scale 20 of the invention on which an interlocking connection to the object 50 is made in a further embodiment, is shown in a sectional view. The scale 20 is on the one hand connected frictionally to the object 50 via a screw 32. For the interlocking connection according to the invention of the scale to the object 50, two balls 30 serve in this exemplary embodiment; they are markedly smaller than the balls described earlier herein. In the case of the arrangement of FIG. 7, the balls have a diameter of a few millimeters.

As can be seen from FIG. 7, the balls are disposed on both sides next to the screw 32. Otherwise, the view of FIG. 7 corresponds to a longitudinal section; that is, the balls 30 and the screw 32 are disposed along the lengthwise direction of the scale 20. The interlocking connection is attained on the part of the scale by means of a conical recess 64, into which the respective ball 30 is placed. In the context of attaching the scale, the balls 30 can be fixed in their respective recess 64, for instance by means of an adhesive.

Next, the scale is disposed on the surface of the object 50 and secured by means of the screw 32. In this process the two balls 30 each press into the top side of the object 50 and indent it, so that in the final state a kind of seat with a spherically curved surface is formed, which cooperates with the respective ball 30 to form an interlocking connection. This pressing inward is made possible in particular because the object 50 by way of example is a machine bed made of gray cast iron that is indented by the balls used, which are of a suitable hardness.

Figure 8:
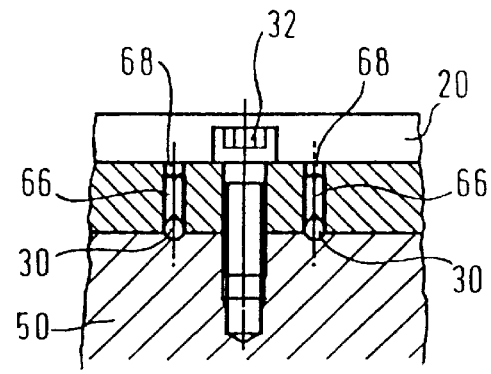
FIG. 8, in a sectional view, a portion of a device according to the invention with the interlocking connection in a still further embodiment.

In FIG. 8, an arrangement according to the invention with a combination of balls 30 and pins 66 is shown. Instead of the conical recess 64 of the embodiment of FIG. 7, the front end of the respective pin 66 is provided with a conical recess. Respective bores 68 are also made in the scale. Once the scale has been screwed to the object 50 by the frictional fastening screw 32, the balls 30 are inserted into the respective bore 68. Next, a threaded pin 66 with a conically recessed end face is screwed into the bore 68 and presses the respective ball 30 into the surface of the object 50 in such a way that the interlocking connection of the invention is made. As a result, in the secured state, the entire region of the scale 20 moves along with the respective region on the object 50, in the surroundings of the fastening point shown, in such a way that measurement errors caused by different expansion of the scale 20 and of the object 50 can be eliminated.

Figure 9:
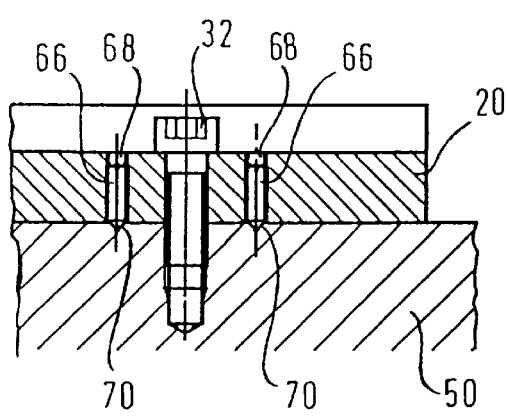
FIG. 9, in a sectional view, a portion of a device according to the invention with the interlocking connection in a further embodiment.

In FIG. 9, a further embodiment of the invention using pins 66 is shown. The fastening screw 32 and the bores 68 in the scale 20 correspond to the embodiment of FIG. 8. However, the two pins 66 have a conical tip. When the respective pin 66, embodied as a threaded pin, is screwed into the bore 68 the conical tip 70, on reaching the surface of the object 50, thus presses into the object and indents it, so that once again the interlocking connection of the invention is made between the scale and the object 50.

Figure 10:
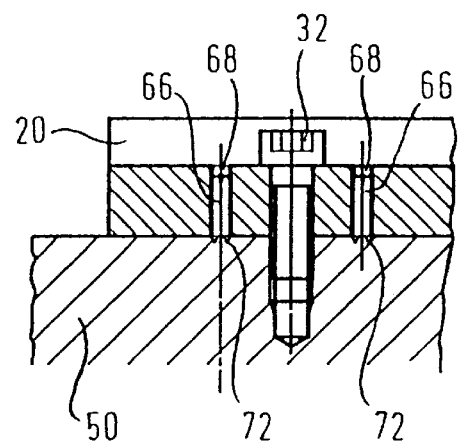
FIG. 10, in a sectional view, a portion of a device according to the invention with the interlocking connection in a still further embodiment.

In the embodiment of FIG. 10, similarly to the embodiment of FIG. 9, two pins 66 are screwed into a bore 68 in the scale 20. In the especially advantageous embodiment of FIG. 10, however, the two pins 66 have a face end that is provided with a so-called cup point 72. The cup point is essentially a pointed rib with a largely triangular cross section, which is embodied encompassing the peripheral region of the face end of the respective pin 66. Similarly to the embodiment of FIG. 9, the cup point presses into the surface of the object 50 as the threaded pin 66 is tightened, thus assuring an interlocking engagement with the indentation that is made in the object while the pin is being screwed in.

Figure 11:
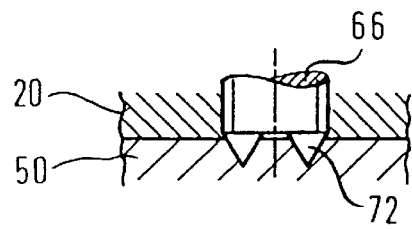
FIG. 11, a detail of the arrangement of FIG. 10.

For the sake of illustration, the region of the front face end of a pin 66 having the cup point 72 is shown in FIG. 11. The cup point is pointed and has a sharp front edge extending in a circle. As is readily seen from FIG. 11, as the pin 66 is screwed tight this front edge penetrates the surface of the object 50 and thus in an advantageous supplement to the frictional engagement by the screw 32, connects the scale 20 interlockingly to the object 50. With this embodiment, particularly good results have been observed in tests for an expansion performance of a scale 20 mounted in this way or a scanning unit secured in this way. The device follows the expansion behavior of the object 50 extremely exactly, thus minimizing measurement errors resulting from expansions that can occur as a consequence of temperature fluctuations, for instance. Within the scope of the method of the invention for attaching a scale, it is in fact possible, in the exemplary embodiment shown in FIG. 2, to use the balls 22, 30 themselves for marking and embodying the corresponding forms. To that end, according to the invention, the scale 20 with the balls 22, 30 attached to it is placed at a desired place of the object 40, and those places where the grooves 44, 40 are to be made are first marked, using the balls 22, 30. At these places, the threaded bores can then be made, into which the fastening screws 26, 32 are screwed when the scale 20 is being attached. At the corresponding places, the grooves 44, 40 required for receiving the balls 22, 30 are then made directly in the object 50. These grooves may for instance be milled directly into the object 50. In conclusion, the scale 20, for its interlocking fastening, is secured to the object 50 via the fastening screws 26, 32 passed through the balls 22, 30. The head of each of the fastening screws 26, 32 is supported on a shoulder toward a region of the bore 36 having a smaller diameter.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A measuring device of a measuring instrument for measuring the motion of a first object relative to a second object, the measuring device comprising:

a form fitting connector comprising a curved surface that abuts against a portion of said measuring device, said form fitting connector is secured to said measuring device by a screw and is used to secure said measuring device to said first object; and wherein said form fitting connector comprises a counternut, wherein adjustment of the position of said form fitting connector relative to said first object is accomplished by adjusting said screw and tightening said counternut.

2. A measuring device of a measuring instrument for measuring the motion of a first object relative to a second object, the measuring device comprising:

a form fitting connector comprising a curved surface that abuts against a portion of said measuring device, said form fitting connector is secured to said measuring device by a screw and is used to secure said measuring device to said first object, wherein said first object comprises a groove in which said form fitting connector lies, and wherein adjustment of the position of said form fitting connector relative to said first object is accomplished by said screw.

3. A measuring device of a measuring instrument for measuring the motion of a first object relative to a second object, the measuring device comprising:

a form fitting connector comprising a curved surface that abuts against a portion of said measuring device, said form fitting connector is secured to said measuring device by a screw and is used to secure said measuring device to said first object, wherein said first object comprises a groove in which said form fitting connector lies; and wherein said form fitting connector comprises a counternut, wherein adjustment of the position of said form fitting connector relative to said first object is accomplished by adjusting said screw and tightening said counternut.

4. A measuring device of a measuring instrument for measuring the motion of a first object relative to a second object, the measuring device comprising:

a form fitting connector comprising a curved surface that abuts against a portion of said measuring device, said form fitting connector is secured to said measuring device by a screw and is used to secure said measuring device to said first object, wherein said first object comprises a groove in which said form fitting connector lies; and wherein said form fitting connector is secured to said groove by a second screw.

5. The measuring device of claim 4, wherein said form fitting connector comprises a ball.

6. The measuring device of claim 5, wherein said ball comprises a first bore to receive said screw and a second bore to receive said second screw, wherein said first and second bores are offset relative to one another by 90°.

7. The measuring device of claim 4, wherein said form fitting connector comprises a cylinder.

8. The measuring device of claim 7, wherein said cylinder comprises a first bore to receive said screw and a second bore to receive said second screw, wherein said first and second bores are offset relative to one another by 90°.

9. The measuring device of claim 7, wherein said cylinder comprises a grooved adapter that engages said cylinder and receives said screw.

10. The measuring device of claim 4, wherein said form fitting connector comprises a cylinder that comprises a grooved adapter that engages said cylinder and receives said screw; and wherein said form fitting connector comprises an end of a pin that is inserted through said measuring device so that said end of said pin contacts said first object.

11. The measuring device of claim 10, wherein said end of said pin comprises a conical tip.

12. The measuring device of claim 10, wherein said end of said pin comprises a cup point.

13. The measuring device of claim 12, wherein said cup point comprises a pointed rib with a largely triangular cross section.

14. The measuring device of claim 12, wherein said cup point comprises a sharp front edge extending in a circle.

15. A measuring device of a measuring instrument for measuring the motion of a first object relative to a second object, the measuring device comprising:

a support surface that is in physical contact with a first object;

a form fitting connector that comprises a ball and is positioned between and in direct contact with said support surface and said first object, said form fitting connector is used to secure said measuring device to said first object;

a second ball positioned between and in direct contact with said support surface and said first object; and a screw aligned with said first and second balls and positioned therebetween.

16. The measuring device of claim 15, wherein said first and second balls form indents in said first object.

17. A measuring instrument for measuring the relative movement between a first object and a second object, said measuring instrument comprising:

a scale attached to a first object that has a depression, a scanning unit attached to a second object, wherein said scanning unit moves relative to said scale;

a form fitting connector for securing said scale to said first object; and a pressure element that urges said form fitting connector into said depression.

18. The measuring instrument of claim 17, wherein said form fitting connector provides for a favorable transmission of forces which occur upon temperature fluctuations as a consequence of changes of length of said first object.

19. The measuring instrument of claim 17, wherein said first object comprises a groove in which said form fitting connector lies.

20. The measuring instrument of claim 19, wherein said groove is oriented perpendicular to a side of said scale.

21. The measuring instrument of claim 19, wherein said groove is oriented parallel to a side of said scale.

22. The measuring instrument of claim 17, wherein said form fitting connector comprises a curved surface that abuts against a portion of said scale.

23. The measuring instrument of claim 22, wherein said form fitting connector comprises a ball.

24. The measuring instrument of claim 22, wherein said form fitting connector comprises a cylinder.

25. The measuring element of claim 22, wherein said curved surface of said form fitting connector interlockingly engages a depression formed in said scale and said form fitting connector has a second curved surface that interlockingly engages said depression of said first object.

26. The measuring element of claim 25, further comprising:

a second pressure element that urges said form fitting connector into said depression formed in said scale.

27. The measuring instrument of claim 17, wherein said form fitting connector is positioned between and in direct contact with said scale and said first object.

28. The measuring instrument of claim 27, wherein said form fitting connector comprises a ball.

29. The measuring instrument of claim 27, further comprising a recess in which said form fitting connector is positioned.

30. The measuring instrument of claim 17, further comprising a pin inserted through said scale so that an end of said pin contacts said form fitting connector.

31. The measuring instrument of claim 30, wherein said form fitting connector comprises a ball.

32. The measuring instrument of claim 17, wherein said form fitting connector comprises an end of a pin that is inserted through said scale so that said end of said pin contacts said first object.

33. The measuring device of claim 17, wherein said first object comprises a machine bed.

34. The measuring device of claim 17, wherein said groove is V-shaped.

35. The measuring device of claim 17, wherein said form fitting connector is secured to said measuring device by a screw.

36. The measuring device of claim 17, wherein adjustment of the position of said form fitting connetor relative to said first object is accomplished by said screw.

37. The measuring device of claim 17, comprising: a support surface that is in physical contact with a first object.

38. The measuring device of claim 17, wherein said form fitting connector is positioned between and in direct contact with said support surface and said first object.

39. The measuring element of claim 22, wherein said pressure element is arranged so as not to transmit forces between said scale and said first object during thermal expansion of either said scale or said first object.

40. The measuring element of claim 17, further comprising a second form fitting connector for securing said scale to said first object, wherein said form fitting connectors are located between two ends of said scale.

41. A measuring instrument for measuring the relative movement between a first object and a second object, said measuring instrument comprising:

a scale attached to first object, a scanning unit attached to a second object that has a depression, wherein said scanning unit moves relative to said scale; and a form fitting connector for securing said scanning unit to said second object; and a pressure element that urges said form fitting connector into said depression.

42. The measuring instrument of claim 41, wherein said form fitting connector provides for a favorable transmission of forces which occur upon temperature fluctuations as a consequence of changes of length of said second object.

43. The measuring instrument of claim 41, wherein said second object comprises a groove in which said form fitting connector lies.

44. The measuring instrument of claim 43, wherein said groove is oriented perpendicular to a side of said scanning unit.

45. The measuring instrument of claim 43, wherein said groove is oriented parallel to a side of said scanning unit.

46. The measuring instrument of claim 41, wherein said form fitting connector comprises a curved surface that abuts against a portion of said scanning unit.

47. The measuring instrument of claim 46, wherein said form fitting connector comprises a ball.

48. The measuring instrument of claim 46, wherein said form fitting connector comprises a cylinder.

49. The measuring instrument of claim 41, wherein said form fitting connector is positioned between and in direct contact with said scanning unit and said second object.

50. The measuring instrument of claim 49, wherein said form fitting connector comprises a ball.

51. The measuring instrument of claim 49, further comprising a recess in which said form fitting connector is positioned.

52. The measuring instrument of claim 41, further comprising a pin inserted through said scanning unit so that an end of said pin contacts said form fitting connector.

53. The measuring instrument of claim 52, wherein said form fitting connector comprises a ball.

54. The measuring instrument of claim 41, wherein said form fitting connector comprises an end of a pin that is inserted through said scale so that said end of said pin contacts said first object.

55. The measuring element of claim 41, wherein said pressure element is arranged so as not to transmit forces between said scanning unit and said second object during thermal expansion of either said scanning unit or said second object.

56. The measuring element of claim 41, wherein said form fitting connector has a first curved surface that interlockingly engages a depression formed in said scale and said form fitting connector has a second curved surface that interlockingly engages said depression of said second object.

57. The measuring element of claim 56, further comprising:

a second pressure element that urges said form fitting connector into said depression formed in said scale.

58. A method for attaching a scale, via a form fitting connector having a through bore, to an object having a depression, said method comprising the following steps:

a) disposing the scale at a place on the object intended for its attachment;

b) embodying a bore in the object, using the through bore of the form fitting connector;

c) embodying forms for the form fitting connector in the object in the region of the bore formed in the object;

d) embodying threads in the region of the bore formed in the object; and e) securing the scale to the object by a connecting element engaging said through bore of the form fitting connector and the bore formed in the object and by urging said form fitting connector into said depression.

59. The method of claim 58, wherein the through bore in the form fitting connector is used for marking the bore formed in the object or is used directly for embodying the bore formed in the object.

60. The method of claim 58, wherein the forms of step c) comprise either a spherical curved seat, a conical seat, a cylindrically curved groove or a V-shaped groove.

61. The method of claim 58, wherein step c) is performed before step b).

* * * * *

UNITED STATES PATENT AND TRADEMARK OFFICE
CERTIFICATE OF CORRECTION

PATENT NO. : 6,092,296
DATED : July 25, 2000
INVENTOR(S) : Günther Nelle

Page 1 of 1

It is certified that error appears in the above-identified patent and that said Letters Patent is hereby corrected as shown below:

Claim 2,
Line 10, delete "lies, and" and substitute -- lies; and -- in its place.

Claim 39,
Line 1, delete "claim 22" and substitute -- claim 17 -- in its place.

Signed and Sealed this

Eighteenth Day of September, 2001

Attest:

NICHOLAS P. GODICI
*Attesting Officer*     *Acting Director of the United States Patent and Trademark Office*